United States Patent
Manin et al.

(10) Patent No.: US 9,151,857 B2
(45) Date of Patent: Oct. 6, 2015

(54) SYSTEM FOR SEISMIC EXPLORATION A SUBMERGED SUBSURFACE INCLUDING IMPLANTED BASES

(75) Inventors: Michel Manin, Sainte-Mesme (FR); Jean-Paul Carle, Chilly (FR); Peter Weiss, Marseilles (FR); Frederic Schom, Marseilles (FR)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 2878 days.

(21) Appl. No.: 10/586,847

(22) PCT Filed: Jan. 21, 2005

(86) PCT No.: PCT/IB2005/000339
§ 371 (c)(1),
(2), (4) Date: Jul. 20, 2006

(87) PCT Pub. No.: WO2005/071442
PCT Pub. Date: Aug. 4, 2005

(65) Prior Publication Data
US 2011/0216625 A1    Sep. 8, 2011

(30) Foreign Application Priority Data
Jan. 21, 2004   (FR) ..................................... 04 00544

(51) Int. Cl.
*G01V 1/38*   (2006.01)
(52) U.S. Cl.
CPC ........................................ *G01V 1/38* (2013.01)
(58) Field of Classification Search
CPC ....................................................... G01V 1/38
USPC .................. 114/222, 230, 321; 138/101, 177; 174/101.5; 181/110, 112, 122; 365/52, 365/66, 226; 367/6, 15, 16, 20, 130, 133, 367/154, 178, 188; 370/69.1; 441/221; 73/12.13, 84; 362/249.03, 249.06, 457
See application file for complete search history.

(56) References Cited

U.S. PATENT DOCUMENTS 2,224,565 A * 12/1940 Flude ............................ 138/177
3,256,539 A *  6/1966 Clark ............................. 441/21
(Continued)

FOREIGN PATENT DOCUMENTS

| | | |
|---|---|---|
| EP | 1 217 390 | 6/2002 |
| GB | 2 392 245 | 2/2004 |

OTHER PUBLICATIONS

Bibee, L.D. et al, "Seismic Penetrator Technology for Use in Shallow Water Seismoacoustics", IEEE, Oct. 18, 1993, pp. 1450-1454, XP010117379, ISBN: 0-7803-1385-2.
(Continued)

*Primary Examiner* — Daniel L Murphy
(74) *Attorney, Agent, or Firm* — Park, Vaughan, Fleming & Dowler LLP (57) ABSTRACT

A system for seismic exploration of a submerged sub-surface comprises a plurality of bases (4) located at predetermined seabed positions, each base comprising an elongate stem penetrating the seabed, at least a seismic sensor (10, 12) within said stem, a radially extending support zone (19) connected to the upper end of the stem, said upper end projecting from the seabed, and a respective plurality of modules (6) each incorporating a data storage unit and a power source, each module being mechanically and electrically connected to the upper end of said stem, said module being capable of being connected to, and disconnected from, the base by an underwater vehicle.

17 Claims, 5 Drawing Sheets

(56) References Cited

U.S. PATENT DOCUMENTS

| | | | |
|---|---|---|---|
| 4,775,962 A * | 10/1988 | Keckler et al. | 367/154 |
| 4,953,123 A * | 8/1990 | Takeuchi et al. | 365/66 |
| 5,160,201 A * | 11/1992 | Wrobel | 362/249.03 |
| 5,189,642 A | 2/1993 | Donoho et al. | |
| 5,253,223 A | 10/1993 | Svenning et al. | |
| 5,279,244 A * | 1/1994 | Perez-Collazo | 114/222 |
| 5,442,590 A | 8/1995 | Svenning et al. | |
| 5,493,895 A * | 2/1996 | Cyr et al. | 73/12.13 |
| 6,477,111 B1 * | 11/2002 | Lunde et al. | 367/20 |
| 6,588,980 B2 | 7/2003 | Worman et al. | |
| 6,625,083 B2 * | 9/2003 | Vandenbroucke | 367/15 |
| 6,975,560 B2 * | 12/2005 | Berg et al. | 367/16 |

OTHER PUBLICATIONS

First Examination Report by the Indian Patent Office in related Indian Application No. 4555/DELNP/2006, dated Aug. 29, 2012 (all documents referenced in this Indian First Examination Report were previously provided to the USPTO in an IDS or cited by the Examiner).

* cited by examiner

SYSTEM FOR SEISMIC EXPLORATION A SUBMERGED SUBSURFACE INCLUDING IMPLANTED BASES

CROSS-REFERENCE TO RELATED APPLICATION

This national phase application is based on PCT/IB2005/000339 filed on Jan. 21, 2005 which claims priority to French Application No. 0400544 filed Jan. 21, 2004 entitled "System for Seismic Exploration of a Submerged Subsurface Including Implanted Bases".

The invention relates to the seismic exploration of a submerged sub-surface.

A system for the exploration of a submerger sub-surface is known from document EP-1 217 390. In the said document, in the embodiment as in FIG. 5, the system consists of antennae each of which is made up on the one hand of a base which incorporates a geophone, and on the other of a module which incorporates data storage means. Each antenna in which the module is initially fixed to the base is released, from a ship for example, in order to become anchored in a submerged bed. This document explains that during a seismic exploration survey implementing the emission of an acoustic wave, the signals transmitted in the sub-surface to the antenna are picked up by the base, and transmitted to the module which stores them in memory. The document further explains that once the module has thus collected the data received from the base, it detaches itself from the said base and returns to the surface of the water with the help of an inflatable buoy, where it is supposedly retrieved in order to assemble the data.

The proposal described in this document is fraught with major uncertainties, especially in respect of the seabed position actually reached by an antenna and of the anchoring of the antenna to the seabed. In addition, the module can only be used once and it would be necessary, before each exploration survey, to install a new series of antennae, making the implementation overly expensive.

The same document provides in FIG. 6 for the antenna to include several memory cartridges which are supposed to be successively loaded with seismic data, each one associated with a buoy. The cartridges are supposed to be released individually for surface retrieval.

However, this document fails to describe a power source capable of supplying the power required for the operation of the antenna over a long period of time.

The invention relates in particular, though not exclusively, to the monitoring of oilfields during their exploitation. The needs of oil companies in this matter have been recognized but it is necessary to reduce costs for such purposes and to further provide for systems which make possible conditions for measurement which are sufficiently stable and precise.

One aim of the invention, therefore, is to allow the monitoring of a submerged sub-surface over a very long period of time at a reduced cost and with good reliability of measurements.

With this in mind, the invention provides for a system of seismic exploration of a submerged sub-surface including:
a number of bases each incorporating at least one sensor; and
a module associated with each base and incorporating data storage media,
the system incorporating facilities which can be dismantled again for fitting the module onto the base.

Thus the module may be fitted onto or dismantled from the base as required. In particular, whenever a survey to acquire data is organized, the module can be fitted onto the base, the survey carried out and then the module removed from the base. There can therefore be very long periods of time separating successive data-acquisition surveys on the same seabed all still at a reduced cost. In addition, as the base can remain in the same spot, stability is preserved for the conditions of measurement.

The system according to the invention may further have at least any one of the following features:
the module is fitted onto the base by means of a sliding motion followed by a rotation about an axis parallel to the direction of the sliding motion,
it includes facilities to bring the module to the base and facilities to carry out the fitting of the module onto the base,
it includes submerged facilities for storage of one or more modules dismantled from their bases,
the base includes a stem and a support zone extending radially in projection from the stem in order to prevent a portion of the base situated above the support zone from penetrating the ground,
the support zone presents a smooth lower face,
the support zone presents orifices extending in a direction which is not perpendicular to a longitudinal direction of the stem,
the support zone presents an upper face widening out towards a lower face of the support zone,
the base presents a housing for the module and facilities to seal the housing when the module is absent,
the base includes a mooring element for a vehicle,
it includes facilities for carrying out the dismantling of the module on the base and facilities for transporting the module away from the base,
the module has a density roughly equal to 1,
the module includes a source of electrical power,
the module includes a clock,
the module includes means for transmitting and/or receiving an acoustic signal,
the base includes at least one geophone,
the base includes an acoustic decoupler between the geophone and a zone of the base suitable for receiving the module,
the base includes a hydrophone,
the base includes a digitizer,
the base has a height ranging between 1 and 40 meters,
the fitting facilities are suited to establishing an electrical connection by contact between the base and the module,
the fitting facilities are suitable for positioning the module on the base in order to establish a magnetic link between parts of the base and of the module without contact of the parts one with another,
it includes several bases connected between themselves by a cable, and
it includes several bases without a cable link between them.

Also provided for according to the invention is a base suitable to be part of a system according to the invention.

Also provided for according to the invention is a module suitable to be part of a system according to the invention.

Finally provided for according to the invention is a seismic exploration process of a submerged sub-surface, in which at least one module including data storage media is fixed to a base fixed to a submerged bed and incorporating at least one sensor.

The process according to the invention may also have at least any one of the following features:
it includes the previous stage consisting of fixing the base to the bed, the base is fixed to the bed by releasing the base in free fall towards the bed, the base is fixed in such a way that a zone of the base suitable for receiving the module extends in projection from the bed, in a manner concomitant with the fixing stage, a module operation is tested, in which provision is made for a later stage consisting of carrying out a seismic exploration of the sub-surface by means of the base and the module, the exploration is carried out by means of several bases without a cable link between them, it includes the later stage consisting of removing the module from the base and taking the module away from the base, and several bases suitable for receiving respective modules are connected by at least one cable.

There is also provided according to one aspect of the invention a system for seismic exploration of a submerged sub-surface including:

a plurality of bases located at predetermined seabed positions, each base comprising an elongate stem penetrating the seabed, at least a seismic sensor within said stem, a radially extending support zone connected to the upper end of the stem, said upper end projecting from the seabed, and a respective plurality of modules each incorporating a data storage unit and a power source, each module being mechanically and electrically connected to the upper end of said stem, said module being capable of being connected to, and disconnected from, the base by an underwater vehicle.

According to another aspect of the invention, there is provided a method of seismic exploration of a submerged sub-surface, comprising the steps of lowering near a predetermined seabed position a base having an elongate stem and at least a seismic sensor within the stem, a radially extending support zone being connected to the upper end of the stem, anchoring the stem to the seabed while keeping its upper end projecting from the seabed, connecting a module including data storage means and a power source to the upper end of the stem by means of an underwater vehicle, repeating the steps above for each seabed position at which seismic data must be acquired, and disconnecting said modules from the respective bases after completion of the seismic acquisition by means of an underwater vehicle.

Other features and advantages of the invention will also appear in the following description of a preferred embodiment given by way of non-limiting example and with reference to the attached drawings where.

Illustrated in FIGS. 1 to 6 and 9 to 15 is a system for seismic exploration of a submerged sub-surface according to a preferred embodiment of the invention.

Figure 1:
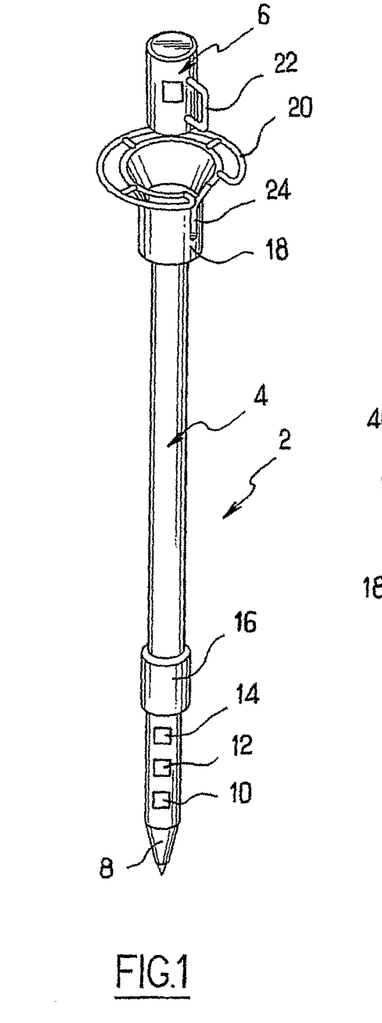
FIG. 1 is a perspective view of the components of an antenna according to an embodiment of the invention, namely a base and a module.

The system includes a series of antennae 2 each made up of a base 4 and a module 6.

The base 4 has in the case in point an extended shape essentially in the form of a stake or stem. It has geometrically over the greater part of its length a cylindrical shape with circular cross section. The height of the base can range between 1 and 40 meters according to the nature of the seabed in which it is intended to install it.

The base has a lower end 8 in the form of a tapered pointed end to facilitate penetration of the base for the purposes of anchoring it to the seabed.

In a lower part of the base close to the pointed end 8 the base includes a group 10 of three geophones oriented in three orthogonal directions, one hydrophone 12 together with a digitizer 14 ensuring analog-digital conversion.

Above these elements the base includes an acoustic decoupler 16.

Figures 2, 3, 4:
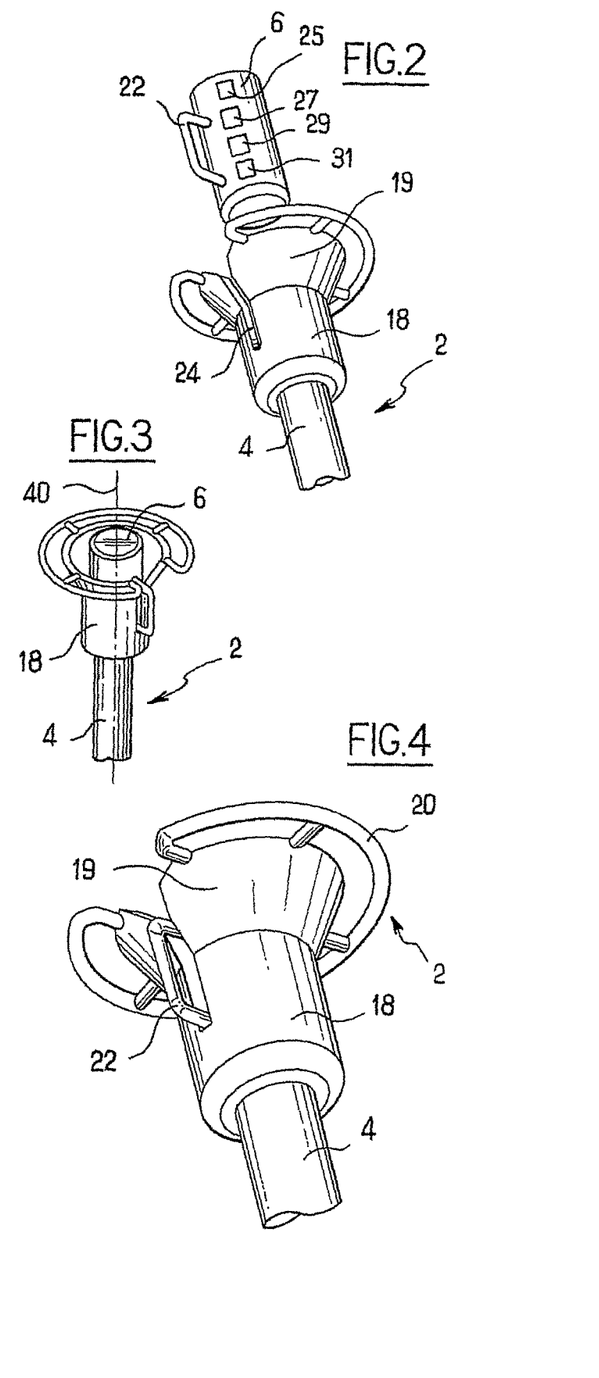
FIG. 2 is another perspective view showing the upper part of the base together with the module of the antenna from FIG. 1.
FIGS. 3 and 4 are two views in perspective showing the upper part of the base and the module received therein.

The base 4 presents at its upper end a cylindrical housing 18 which is open towards the top and has a flaring upper part. Zone 19 of the upper end of this housing has a tapered shape the cross section of which flares in a direction opposite to that of the pointed end 8. The base 4 includes, projecting from the circumference of this end, a circular bar 20 extending over more than three quarters of a circle.

The module 6 is generally cylindrical in shape but with little height. It is sufficiently small to be received almost entirely within the housing 18 of the upper end of the base 4.

The module 6 presents an extended grip handle 22 projecting radially from the external surface of the module parallel to the axis of the cylinder which makes up the module. This handle is designed to penetrate a complementary rectilinear slot 24 made in the wall of the housing 18 and opening at its upper end for receiving the handle.

The module 6 has a density roughly equal to 1. It includes a battery 25 supplying the module and base with electrical power and ensuring their autonomy for a period of between 8 and 30 days. The module 6 includes a clock 27 ensuring a drift lower than a determined threshold. It includes a memory 29 of a capacity appropriate for the recording of seismic data. It includes a hard disk and media for the acoustic transmission of compressed data. It also includes means 31 allowing an adjustment by remote communication for synchronizing the clock with a clock of an external element such as a vessel situated on the surface of the water.

Each antenna 4 includes means for connecting the module 6 onto the base 4, which means are capable of being eventually disconnected. These means are designed to allow the module 6 to be brought onto the base 4 when the latter is anchored in a seabed 32 and to be secured thereto. They also allow the module 6 to be disconnected from the base 4 in the same conditions and taken away from the base 4 for retrieval purposes.

The system according to the invention includes means for bringing the module to the base 4 and vice versa for transporting the module away from this base. It also includes means for connecting the module onto the base and for disconnecting the module from the base. The transport means and the connecting/disconnecting means may be constituted by a vehicle of the type ROV (remotely operated vehicle) or the type AUV (autonomous underwater vehicle). Such a vehicle 30 has been illustrated by way of example in FIG. 5. It is of a type known per se and includes, in particular, means for gripping and, manipulating the module 6. It can move between the various bases 4 of the system and a vessel present on the surface.

Provision may be made for example for the connection of the module 6 onto the base 4 to be effected by means of two successive movements:

firstly, as illustrated in FIG. 3, a sliding movement of the module along an axial longitudinal direction 40 of the base to cause it to penetrate into the housing 18;

then a rotation of the module in relation to the base about the axis 40 in order to lock it in position.

In this case suitable passages are provided on the base for the trajectory of the handle 22.

Figure 10:
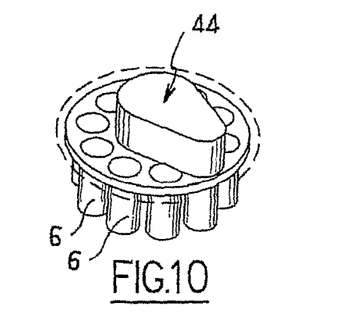
FIG. 10 is a perspective view of an element for installation of the modules of the system of FIG. 1.

These actions can be accomplished for example by a specific tool 44 which also serves as a beacon changer, in the form of a small barrel-type system, as illustrated in FIG. 10. This tool is thus capable of carrying ten beacons 4.

Figure 11:
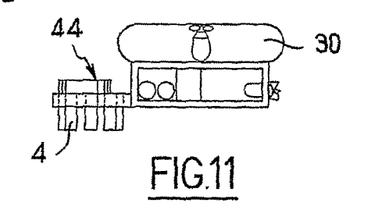
FIGS. 11 and 12 are two side views of two embodiments of a vehicle incorporating the element as in FIG. 10.

Such a tool may be of the type SKID known per se and fitted onto a vehicle 30 as shown in FIG. 11. If a standard connection is used to connect the tool 44 to the vehicle 30, it is possible to use the same tool on several vehicles.

Figure 12:
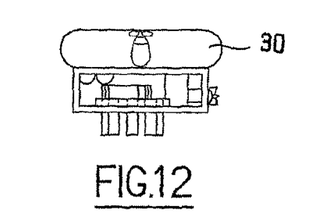

Alternatively the tool 44 may form part of the vehicle 30 as illustrated in FIG. 12. The tool may then be located under the vehicle and no longer at the front of this as shown in FIG. 11. This solution reduces the overall space occupied by the tool.

The means for connecting the module 6 onto the base 4 are here arranged so as to establish an electrical connection by contact between the base and the module once the latter has been received into the housing 18.

Figure 15:
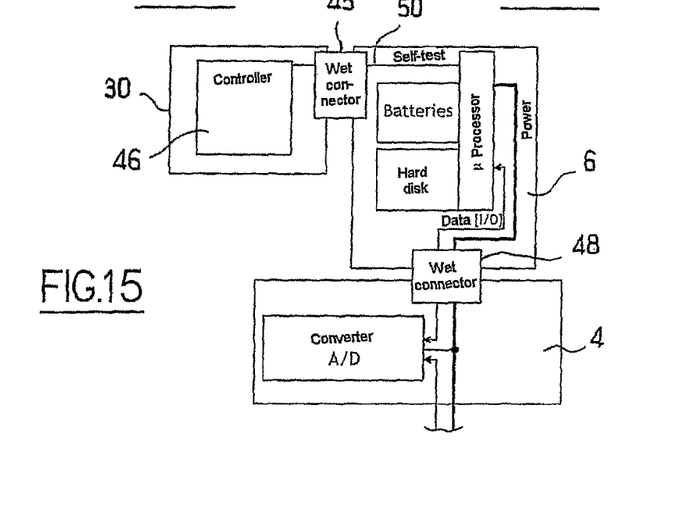
FIG. 15 is a diagram of the electrical connections during the stage of FIG. 14.

FIG. 15 shows the various sorts of connections to be established. The module 6 installed on the base 4 contains batteries for electricity supply to the sensors, and the hard disk. The data are received by the modules via the analog-digital converter of base 4.

During the connection onto the base, a connector 45 of the type suitable for operation in a submerged medium (called a "wet connector") connects the controller 46 of the vehicle 30 to the module 6. Another connector 48 of the same type connects the module 6 to the base 4.

Auxiliary functions such as switching to standby, reactivation and self-test are desired.

It is desirable to be able to activate these functions at any time during the operation, for example by an acoustic signal, and for this purpose provision is made in appropriate fashion for an acoustic modem installed on the modules 6.

The self-test makes it possible to ensure that the modules are operating correctly. Provision can be made to enable this test to be carried out at any time, and this is possible provided that a connection to the surface or to the vehicle can be established.

Figure 13:
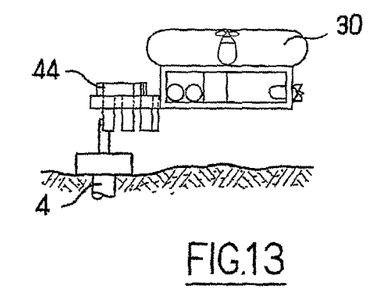
FIGS. 13 and 14 illustrate two stages of installation of a module onto a base in the system of FIG. 1.
Figure 14:
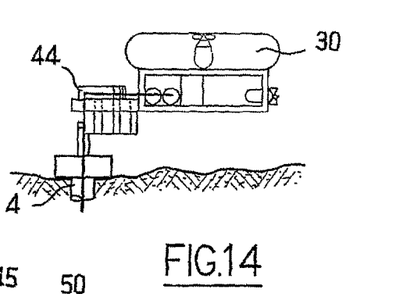

An intermediate solution consists in completing the self-test during the installation of the module, or in relation to such installation via a link to the vehicle: when the mechanical and electrical connections of the module 6 to the base 4 have been accomplished, the module effects a second connection 50 to the vehicle. If this connection creates problems, a message can be sent to the surface and the beacon could be changed. Thus FIG. 13 shows the installation of the module and FIG. 14 the later self-test phase.

In a modified embodiment, the module is electrically connected to the base by a magnetic link (inductive coupling) without contact between the facing parts of the module and the base, once the module 6 has been received in the base 4.

The process according to the invention is implemented for example in the following manner.

Figure 6:
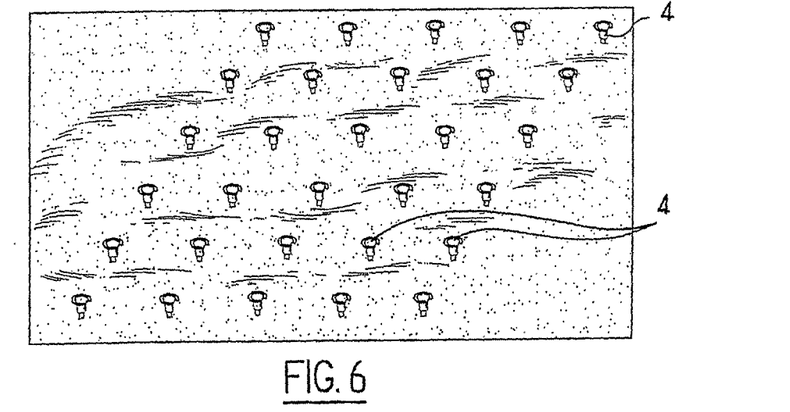
FIG. 6 is an overall view showing a network of antennae as in FIG. 1 installed in the seabed.

In a first stage, a series of bases 4 are anchored to a submerged bed 32, for example a seabed, extending above the sub-surface for which seismic exploration is desired. The bases are for example arranged as a network which may have the form of a grid pattern as shown in FIG. 6. It is possible for example for the bases 4 to be set out on the submerged bed by providing between neighbouring bases a distance which can range between 150 and 300 m.

Figure 5:
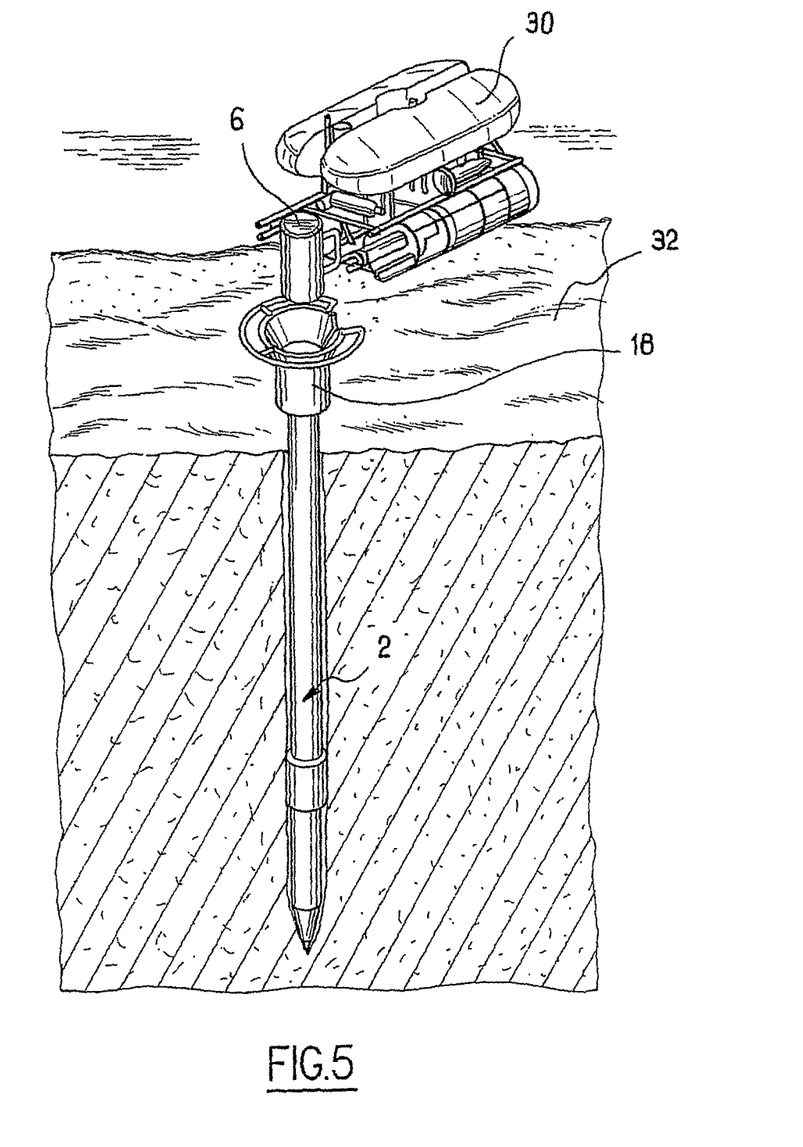
FIG. 5 is a view in perspective and in cross section of a seabed showing the antenna of FIG. 1 and an underwater vehicle.

With reference to FIG. 5, each base 4 is pushed into the seabed over the greater part of its height. However, care is taken that the upper end of the base 4 corresponding to the housing 18 extends as a projection from the bed in order to be easily accessible.

This installation can be performed by various techniques, such as drilling. In this case in point, preference is given to the technique of location by free fall. To achieve this each base 4 is ballasted and brought to a defined height above the bed. Once at this height the base is released to allow it to descend in free fall towards the seabed and then to sink partially into this bed.

In order to avoid the system going in too far a collar is suitably provided near the upper end of the base in order to limit its penetration into the ground so that the desirable level will not be exceeded.

Figure 16:
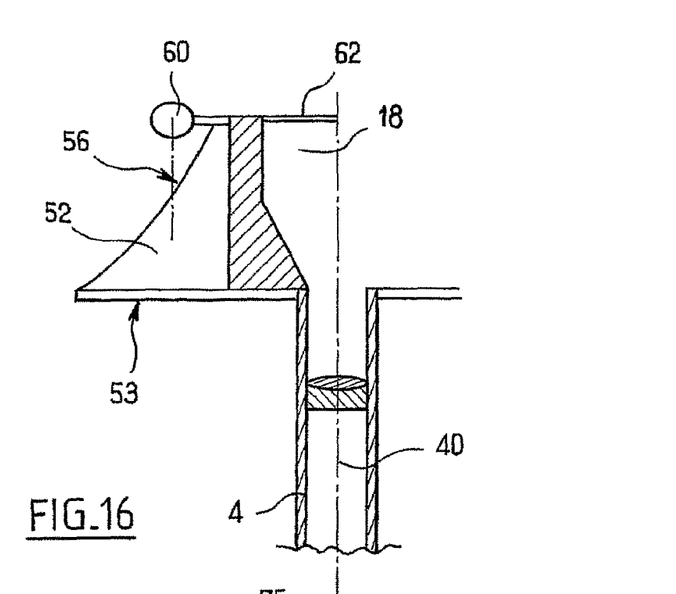
FIG. 16 is a partial cross-sectional view of the upper end of a base according to an embodiment variant.

This is the purpose of the embodiment illustrated in FIG. 16. The base has a wall 52 shown in partial cross section forming a support zone on the sea floor. The wall 52 has a smooth lower face 53 perpendicular to the axis 40 of the stem of the base.

The wall 52 surrounds the housing 18 for receiving the module 6. The wall has an upper face 56 which flares from an upper end of the base 4 in the direction of the lower face 53. This shape provides an acoustic signature facilitating the identification of the base by a sonar, such as a sonar of the underwater vehicle 30. The base has, at its upper end, an element 60 such as a ring by mooring the vehicle 30 to the base during certain operations such as the connection or disconnection of a module.

The base 4 has here a foldable sealing element such as a flap 62 allowing the housing 54 to be sealed whenever the module is absent, so as to avoid its space being taken up by foreign bodies particularly organisms which might develop there. It also protects the interior of the housing from corrosion. In order to allow the base to anchor to the seabed by free fall, the wall 52 has openings (not illustrated) extending in a direction not perpendicular to the axis 40 and for example parallel to the said axis.

Figure 17:
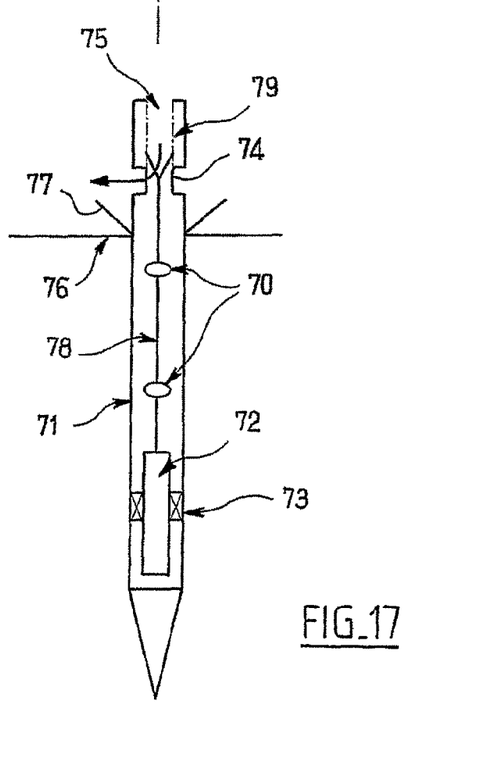
FIG. 17 shows another embodiment variant of the base.

FIG. 17 represents a modified embodiment of the base 4 in which the interior of the base is in pressure equilibrium with the outside. This is obtained by means of openings 70 arranged in the external wall 71 of the base, which allow the water to fill the interior of the base during its descent. The sensors are placed inside a waterproof casing 72 connected to the wall of the base through a decoupling element 73. Openings 74 are arranged near the upper part 75 of the base in which the beacon is received, in such a way that, when the beacon penetrates the part 75, it expels the water therein, as indicated by the arrow and thus expels the deposits that have been able to build up therein. FIG. 17 shows the base pushed into the seabed, the bed level being represented by the line 76. A corolla corresponding to the corolla 19 of FIG. 1 is shown in diagrammatic form at 77. A conductor 78 connects the sensors to the contactless coupling device 79 provided on the internal wall of the upper part 75.

As illustrated in FIG. 6, the bases 4 are independent of one another and are not connected by cables 34, the exploration survey being carried out without a cable link between the bases 4.

By means of the vehicle 30, there is then brought to each base 4 a respective module 6 which is installed in the housing 18 in order to ensure a mechanical and operational connection between them. Each base/module pair constitutes an exploration antenna.

Once the antennae are thus assembled, a seismic exploration survey of the sub-surface is carried out. To do this, in a manner known per se, an acoustic wave is emitted for example from a vessel on the surface. The acoustic wave is reflected in the sub-surface as far as the bases 4 and detected by the geophones 10 in these bases. A fraction of the signal transmitted into the water is also detected by the hydrophone 12 of the base. The data received by these sensors are transmitted to the module 6 and stored in the memory 29.

Finally, by means of the vehicle 30, the modules 6 are collected up. To achieve this, the vehicle 30 disconnects in succession each module 6 from the corresponding housing 18 and takes it away, for example up to the abovementioned vessel for the exploitation of the data.

Preferably the module 6 has a small size so as to minimize the cost of its transport by the vehicles. This module 6 is suitably provided with locating means to facilitate its remote identification by the vehicle.

As a variant, the bases 4 could be installed in the bed 32 with the modules 6 already received in the housings 18. The modules are only removed upon completion of the first exploration survey.

Figure 7:
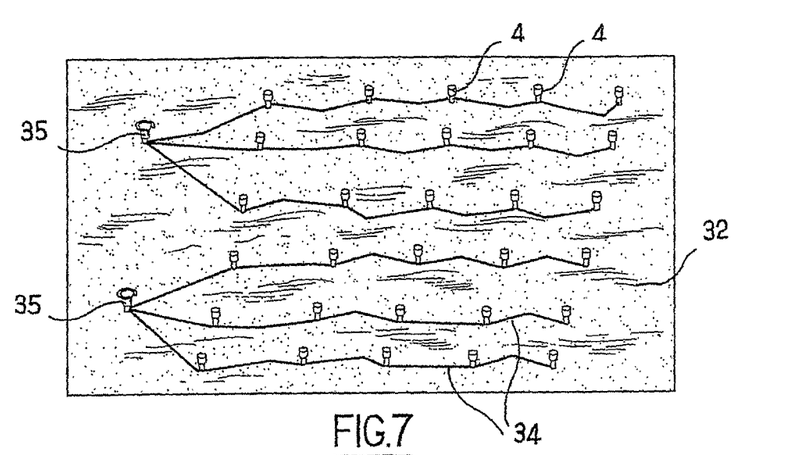
FIG. 7 illustrates a network of antennae similar to that of FIG. 6 in an modified embodiment.
Figure 8:
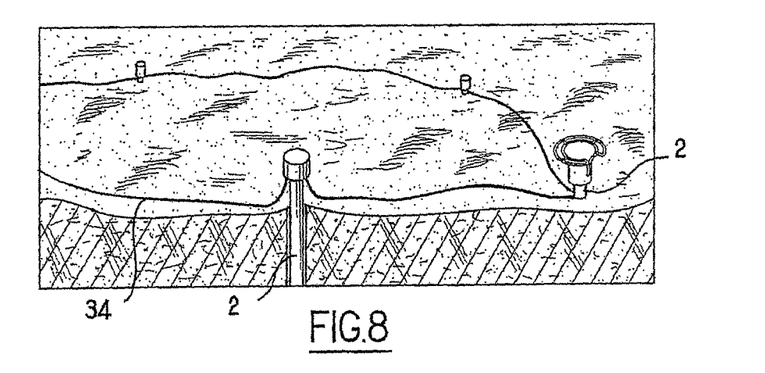
FIG. 8 is a larger scale view of a part of the network as in FIG. 7.

In an embodiment variant illustrated in FIGS. 7 and 8 the bases are connected by means of one or more cables.

Such cables make it possible to connect the bases up into mini-networks with a central node. Thus the antennae of the same group are connected by cable to a seabed station 35 including for example a unit for data and/or power storage.

Figure 9:
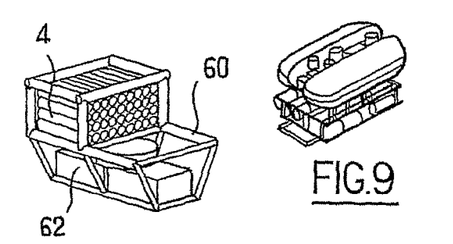
FIG. 9 is a perspective view of a storage medium for the system of FIG. 1.

In order to reduce the volume of the modules to be transported by the vehicle or the total length of the travel which the vehicle has to make, provision could be made for arranging on the sub-surface a storage element 60 for the modules and/or the batteries 62 such as that illustrated in FIG. 9. This element will be located for example in a zone close to the installation of the antennae, for example at 30 m from the field.

The invention allows the monitoring of a submerged bed for long periods at a relatively reduced cost.

In addition the bases 4 remain anchored in the bed between the various successive exploration surveys during which they receive the module 6. The seismic data is therefore always collected at the same positions, which ensures consistency in the measurement conditions, in respect of the positions of the bases 4 as well as of their coupling to the submerged bed. The invention offers measurement conditions sufficiently constant to allow detection of subtle changes of the sub-surface, for example in oil reserves, such as changes relating to pressure, saturation, permeability barriers or superpermeability zones.

The invention allows re-use of the same modules 6 for successive exploration surveys. In addition a faulty module 6 can be replaced at less cost. The invention allows in particular the carrying out of an exploration survey by means of a single vessel situated on the surface for the collection of the data recorded by the modules 6.

The invention makes it possible to use bases 4 and modules 6 having no wire connection, whether temporary or permanent, with the surface.

Naturally, many modifications can be made to the invention without thereby departing from the scope thereof.

Beside, according to one embodiment of the invention, we provide a system for seismic exploration of a submerged sub-surface including:

a plurality of bases located at predetermined seabed positions, each base comprising an elongate stem penetrating the seabed, at least a seismic sensor within said stem, a radially extending support zone connected to the upper end of the stem, said upper end projecting from the seabed, and a respective plurality of modules each incorporating a data storage unit and a power source, each module being mechanically and electrically connected to the upper end of said stem, said module being capable of being connected to, and disconnected from, the base by an underwater vehicle.

The base may include a mooring element for an underwater vehicle.

The module may be fitted onto the base by means of a sliding motion then by a rotation about an axis parallel to the direction of the sliding motion.

The support zone may present orifices extending in a direction not perpendicular to a longitudinal direction of the stem.

The upper end of the base may comprise a housing for receiving the module.

The system may comprise means for sealing the housing in the absence of a module.

The support zone may present an acoustic signature enabling identification thereof by a sonar carried by an underwater vehicle.

The module may have a density roughly equal to 1.

The module may include a clock.

The module may include means for transmitting and/or receiving an acoustic signal.

The stem of the base may have a height ranging between 1 and 40 meters.

The module may be connected to the base by a contactless coupling.

The module may be coupled to the base by a magnetic link.

The system may comprise additional bases connected to at least one of said bases by a cable.

We also provide according to one embodiment a method of seismic exploration of a submerged sub-surface, comprising the steps of lowering near a predetermined seabed position a base having an elongate stem and at least a seismic sensor within the stem, a radially extending support zone being connected to the upper end of the stem, anchoring the stem to the seabed while keeping its upper end projecting from the seabed, connecting a module including data storage means and a power source to the upper end of the stem by means of an underwater vehicle, repeating the steps above for each seabed position at which seismic data must be acquired, and disconnecting said modules from the respective bases after completion of the seismic acquisition by means of an underwater vehicle.

The base may be anchored to the seabed by free fall towards the seabed.

The base may be anchored to the seabed by driving said stem into the seabed.

The invention claimed is:

1. A system for seismic exploration of a submerged sub-surface comprising:

a plurality of bases located at predetermined seabed positions, each base comprising,
an elongate stem penetrating the seabed,
at least a seismic sensor within said stem,
a housing connected to an upper end of the stem, and
a radially extending support zone connected to the housing, said upper end projecting from the seabed; and
a respective plurality of modules each incorporating a data storage unit and a power source, each module being mechanically and electrically connected to the upper end of said stem, said module being capable of being connected to, and disconnected from, the base by an underwater vehicle,
wherein said module is configured to be disposed within said housing.

2. A system according to claim 1, in which the base includes a mooring element for an underwater vehicle.

3. A system according to claim 2, in which the module is fitted onto the base by means of a sliding motion then by a rotation about an axis parallel to the direction of the sliding motion.

4. A system according to claim 3, in which the support zone presents orifices extending in a direction not perpendicular to a longitudinal direction of the stem.

5. A system according to claim 1, in which the housing includes a slot for receiving a handle of the module.

6. A system according to claim 1, comprising means for sealing the housing in the absence of a module.

7. A system according to claim 1, in which the support zone presents an acoustic signature enabling identification thereof by a sonar carried by an underwater vehicle.

8. A system according to claim 1, in which the module has a density roughly equal to 1.

9. A system according to claim 1, in which the module includes a clock.

10. A system according to claim 1, in which the module includes means for transmitting and/or receiving of an acoustic signal.

11. A system according to claim 1, in which the stem of the base has a height ranging between 1 and 40 meters.

12. A system according to claim 1, in which the module is electrically connected to the base by a contactless coupling.

13. A system according to claim 12, in which the contactless coupling is a magnetic link.

14. A system according to claim 1, comprising additional bases connected to at least one of said bases by cable.

15. A method of seismic exploration of a submerged subsurface, comprising the steps of:
lowering near a predetermined seabed position, a base having an elongate stem and at least a seismic sensor within said stem, a radially extending support zone being connected to a housing connected to the upper end of the stem,
anchoring the stem to the seabed while keeping its upper end projecting from the seabed,
connecting a module including data storage means and a power source to the housing by means of an underwater vehicle,
repeating the steps above for each seabed position at which seismic data must be acquired, and
disconnecting said modules from the respective bases after completion of the seismic acquisition by means of an underwater vehicle.

16. A method according to claim 15, in which the base is anchored to the seabed by free fall towards the seabed.

17. A method according to claim 15, in which the base is anchored to the seabed by driving said stem into the seabed.

* * * * *